S. M. BOLING.
ATTACHMENT FOR WEIGHING SCALES.
APPLICATION FILED AUG. 18, 1908.
924,962.
Patented June 15, 1909.
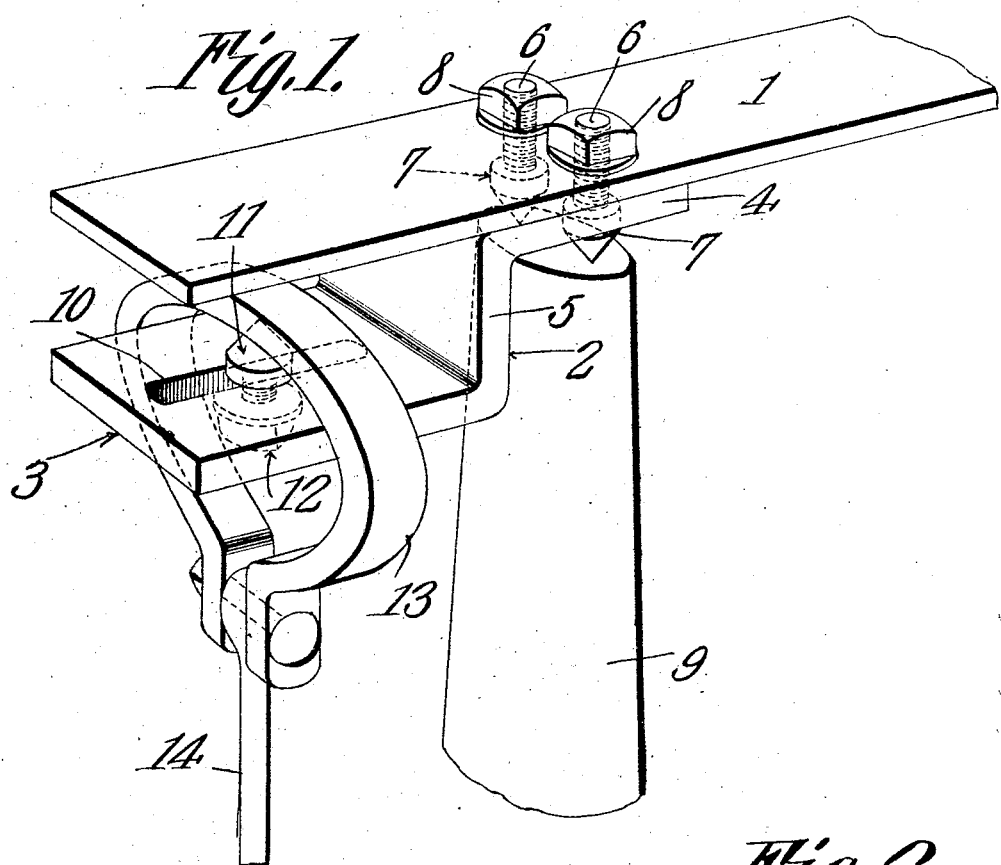
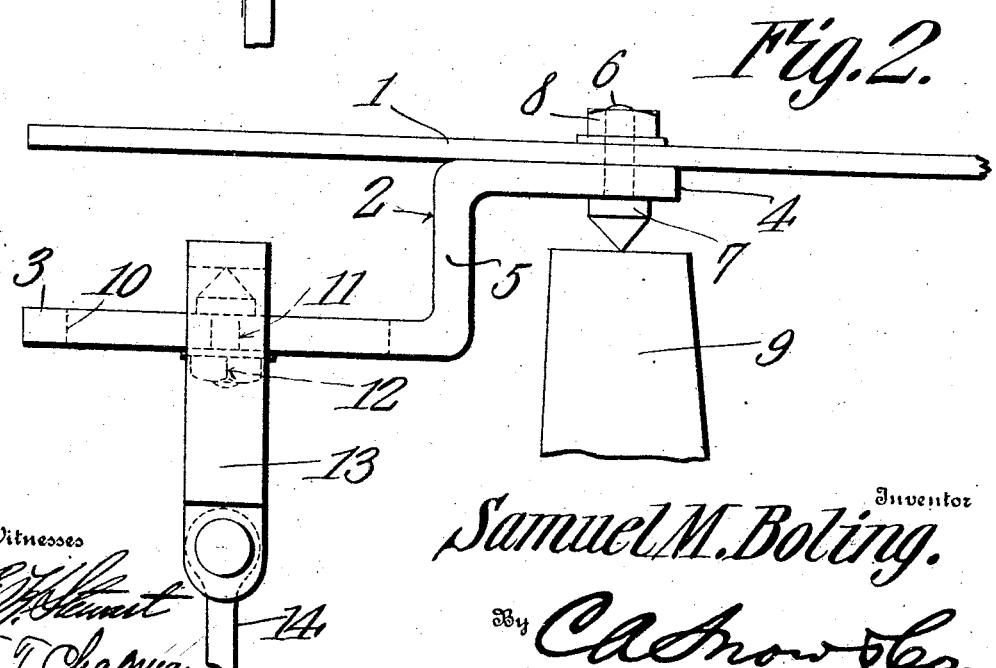
Witnesses
Samuel M. Boling, Inventor
By C. A. Snow & Co., Attorney

UNITED STATES PATENT OFFICE.

SAMUEL M. BOLING, OF CHANDLER, OKLAHOMA.

ATTACHMENT FOR WEIGHING-SCALES.

No. 924,962.  Specification of Letters Patent.  Patented June 15, 1909.

Application filed August 18, 1908. Serial No. 449,094.

*To all whom it may concern:*

Be it known that I, SAMUEL M. BOLING, a citizen of the United States, residing at Chandler, in the county of Lincoln and State of Oklahoma, have invented a new and useful Attachment for Weighing-Scales, of which the following is a specification.

This invention has reference to improvements in attachments for weighing scales, and its object is to provide means whereby scale beams of special character may be attached and adapted to weighing scale structures in place of the beams usually supplied with such scales.
In weighing scales, and more particularly in platform scales designed for supporting and indicating large weights, it is customary to supply a graduated scale beam carrying a sliding poise whereby the load upon the platform may be balanced, and the weight of the load thus indicated. Such scale beams are usually of rectangular shape in cross section, and are also usually set on edge, the scale beam being much narrower in the direction of its width than in the direction of its height.

I have devised a computing scale beam which is used as an attachment to, or supplemental to, the main scale beam of the scales, and this supplemental scale beam is so arranged that the gross weight of the load of material may be taken, and then the load may be conveyed to a suitable point of delivery, and the empty container, usually a wagon, is again returned to the scales and weighed, the result of the indications on the supplemental scale beam showing the net weight of the load removed, instead of as heretofore, giving the tare weight, and necessitating a computation to ascertain the net weight of the material removed from the container. The same device is also adapted to give net quantities, or prices, or both, as may be desired, in addition to, or in place of, the net weight. Such an attachment, when applied to existing scales, disturbs the adjustment of such scales, so that re-adjustment is necessary, in order that the scales may give the correct amount. Furthermore, the use of scale beams such as are employed for obtaining the gross weight of whatever is placed upon the scale platform, when such scale beams are set on edge, as is customary, produces too high a structure when the aforesaid attachment is applied, and so, in conjunction with the said attachment, there is used the ordinary scale beam for ascertaining gross weight, laid flat, that is, it is so attached to the weighing part of the scales, that the height of the beam is much less than its width or thickness. To adapt such a scale beam, together with the aforesaid attachment, to ordinary scales, in place of the scale beams usually supplied with such scales, I have devised a supporting member constituting an adjustable pivot support for the scale beam, and by which the scale beams are connected to the links leading to the weighing platform, this attachment rendering it possible to compensate for the difference in weight between the scale beam ordinarily supplied with the scales and the said attachment.

The invention will be best understood from a consideration of the following detailed description, taken in connection with the accompanying drawings, forming a part of this specification, in which drawings Figure 1 is a perspective view of the attachment forming the subject matter of the present invention, and so much of the scale as is necessary for the understanding of the said invention. Fig. 2 is a side elevation of a structure shown in Fig. 1.

Referring to the drawings, there is shown a scale beam 1, the latter being shown as lying on one face, instead of being arranged on one edge, as is customary in ordinary weighing scales. Otherwise, the scale beam may be substantially identical with scale beams as ordinarily used, and is assumed to have the usual graduations, and to be supplied with a sliding poise, after the manner of ordinary scales.

The scale beam is attached to one end of a support 2, consisting of a comparatively wide and thin strip of rectangular cross section so shaped as to be composed of two legs 3, 4, in parallel displaced relation, with contiguous ends joined by a connecting member 5, perpendicular to both legs, and formed integral therewith. The part 2 may be cast in the shape indicated, or may be bent thereinto from a straight strip of metal of appropriate width and thickness.

The leg 4 is shorter than the leg 3, and is perforated for the reception of two spaced pins, these pins being disposed on opposite sides of a central plane longitudinal to the said leg 4. These pins are indicated in the drawings at 6, and each terminates at one end in a pointed head 7. The other ends of the pins are screw-threaded for the reception of a nut 8, and the threaded ends of the pins extend through appropriate holes in the scale beam 1, the nuts 8 serving to lock the scale beam into firm connection with the leg 4 of the attachment 2. The head 7 is of greater diameter than the threaded stem of the pins, and abuts against the corresponding face of the leg 4, and the passage through the said leg 4 for each pin may be threaded for retaining the threaded portion of the pin, so that the pin is firmly held in the said leg 4.

The two spaced pins 6 constitute the pivot support for the scale beam and whatever may be attached thereto, and in the drawings these two pins are shown as resting upon the upper end of a post 9. This post, however, is to be taken as indicative of any type of support for the pivot pins 6, whether that support be in the form of a post or ledge, or whether it be in the form of a suitable stirrup.

It is found in practice that the pointed pins 6, displaced laterally with relation to the scale beam, are superior to the usual knife-edged pivot support, and I prefer to use such pivot pins to the usual knife edge; but this does not preclude the use of a knife edge if such use be desired. The other leg 3 of the attachment 2 is provided with a longitudinal central slot 10, and through this slot there is passed a headed pin 11, having its head terminating in a point like the heads 7 of the pins 6. The head of the pin 11 is of such width as to straddle the slot 10, and rest on the adjoining walls at the upper face of the member 3 of the attachment 2. The stem of the pin 11 is threaded and receives a nut 12, of such size as to engage the under face of the leg 3, so that the pin may be adjusted to any point along the length of the slot 10, and be there firmly clamped to the leg 3. The pointed end of the pin 11 receives the usual inverted stirrup 13, connected to a link 14, leading to the supporting lever and link system of the weighing platform, which lever and link system is not shown in the drawings, since it is of the usual type found in large platform scales.

By means of the adjustable pin 11, the distance of the point of application of the weight to the scale beam, from the pivot support of said scale beam may be readily adjusted, and then firmly locked against accidental displacement, so that the added weight of the load-indicating supplemental beam and poises can be readily compensated for, and such an attachment may be applied to existing forms of scales by simply substituting the improved scale beam for the ordinary type of scale beam. Since, however, scale beams vary greatly in different types of scales, it is in practice necessary to readjust every scale to which the attachment is applied, and this adjustment is provided for in the adjustable pivot or fulcrum connection forming the subject matter of the present invention.

It has already been stated that the scale beam 1 is placed in the flat position, because, if placed on edge, the application of the attachment for indicating the load would make the entire structure too high. This will be understood when it is considered that the attachment for primarily indicating the weight, quantity or price of the load is in the form of a beam practically co-extensive with the ordinary scale beam, and this beam is placed either above or below the ordinary scale beam. By placing the scale beam 1 in the flat position indicated, there is then ample room either above or below the beam for the supplemental beam referred to. Furthermore, the pins 6 may then be utilized both as pivot pins and as means for securing the scale beam in place.

When the pin 11 has been properly adjusted along the slot 10, and has been locked in place by the nuts 12, it may be so inclosed in the scale structure as to be entirely inaccessible to unauthorized persons, so that the adjustment of the scale, when once effected, may not be tampered with. The member 2 may be further protected by having the rear end of the scale beam 1 overhang the leg 3, as indicated in the drawings.

What is claimed is:—

1. In a scale, a means for adjusting the weight-receiving side of the scale to a scale beam differing from that to which the scale was initially adjusted, comprising a member having at one end a pivot support for the scale beam and means for securing the latter to said member, and at the other end provided with a longitudinal slot, and a pointed pin adjustable to and from the pivot end of said member, and carrying connections to the load receiving end of the scale.

2. In a scale, a pivot support for the scale beam having two displaced parallel legs integrally joined at their contiguous ends and projecting in opposite directions, one leg having perforations for the passage of attaching means for the scale beam, and the other leg having a longitudinal through slot for the adjustment of the connections to the load receiving end of the scale to and from the pivot support of the scale beam.

3. In a scale, a scale beam of greater width than height, and a pivot support therefor comprising a member having a longitudinal slot at one end and laterally spaced perforations at the other end, spaced bolt pins extending through the scale beam and the spaced perforations in the pivot support, and terminating in pointed ends constituting the pivot of the scale beam, and a bolt pin with a pointed end extending through the slot in the pivot member and adjustable therein in a direction to and from the pivot pins.

4. In a scale, a scale beam and a member having one end attached to the scale beam and at the point of attachment provided with pivot supports for the scale beam, and the other end provided with means for the longitudinal adjustment of the connections to the load receiving end of the scale to and from the pivot support of the scale beam.

In testimony that I claim the foregoing as my own, I have hereto affixed my signature in the presence of two witnesses.

SAMUEL M. BOLING.

Witnesses:
J. Ross Colhoun,
F. T. Chapman.